US012438767B2

(12) United States Patent
Sofman et al.

(10) Patent No.: US 12,438,767 B2
(45) Date of Patent: *Oct. 7, 2025

(54) OPTIMAL PLACEMENT OF AGGREGATOR EQUIPMENT IN TELECOMMUNICATION NETWORKS

(71) Applicant: FRONTIER COMMUNICATIONS HOLDINGS, LLC, Dallas, TX (US)

(72) Inventors: Lev B. Sofman, Allen, TX (US); David Curran, Simpsonville, SC (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/135,442

(22) Filed: Apr. 17, 2023

(65) Prior Publication Data
US 2024/0007343 A1    Jan. 4, 2024

Related U.S. Application Data

(63) Continuation of application No. 17/855,900, filed on Jul. 1, 2022, now Pat. No. 11,632,289.

(51) Int. Cl.
*G06F 15/173* (2006.01)
*H04L 41/0631* (2022.01)
*H04L 41/0823* (2022.01)
*H04L 41/0896* (2022.01)

(52) U.S. Cl.
CPC ........ *H04L 41/065* (2013.01); *H04L 41/0823* (2013.01); *H04L 41/0896* (2013.01)

(58) Field of Classification Search
CPC .................. H04L 41/065; H04L 41/0823; H04L 41/0896
See application file for complete search history.

(56) References Cited

U.S. PATENT DOCUMENTS

| 9,356,858 | B2 * | 5/2016 | Vasseur | H04W 40/26 |
| 11,632,289 | B1 | 4/2023 | Sofman et al. | |
| 2013/0135996 | A1 | 5/2013 | Torres | |
| 2014/0259109 | A1 * | 9/2014 | Houston | H04L 63/08 726/3 |
| 2016/0165454 | A1 | 6/2016 | Li | |
| 2017/0288957 | A1 * | 10/2017 | Liu | G06F 11/30 |

(Continued)

*Primary Examiner* — Duyen M Doan
(74) *Attorney, Agent, or Firm* — MARSHALL, GERSTEIN & BORUN LLP

(57) ABSTRACT

Disclosed herein are system, method, and computer program product embodiments for optimal placement of aggregator equipment in telecommunication networks. An embodiment operates by receiving, as an input, information corresponding to resource capacity of the one or more types of aggregator units and resource demands generated by a plurality of access nodes. The embodiment then calculates, based on the input, an optimized traffic aggregation configuration comprising an optimized group of one or more types of traffic aggregator units. Next, the embodiment modifies, based on the optimized traffic aggregation configuration, a network connectivity configuration corresponding to a plurality of network sites. Finally, the embodiment routes network traffic, via the optimized group of one or more types of traffic aggregator units, based on the modified network connectivity configuration.

20 Claims, 6 Drawing Sheets

(56) References Cited

U.S. PATENT DOCUMENTS

2019/0081850 A1* 3/2019 Nazar ................ H04L 63/0227
2022/0342648 A1* 10/2022 Ramaswamy ........ H04L 41/145
2023/0309164 A1* 9/2023 Xu ........................ H04W 28/26

* cited by examiner

OPTIMAL PLACEMENT OF AGGREGATOR EQUIPMENT IN TELECOMMUNICATION NETWORKS

CROSS REFERENCE TO RELATED APPLICATIONS

This application claims priority to U.S. Non-Provisional application Ser. No. 17/855,900, filed on Jul. 1, 2022, the contents of which are hereby incorporated by reference in their entireties.

BACKGROUND

Modern telecommunication networks consist of interconnected network sites that are often geographically distributed. At each network site, network traffic from various access nodes is typically aggregated using an aggregator unit for efficient upstream transportation. Telecommunication network planning and provisioning tools may be used to determine the configuration and the number of aggregator units that are to be deployed at each network site. Since the cost associated with deploying aggregator equipment amounts to a significant fraction of a network's deployment and operational expenditure, there is a need to implement the selection and deployment of aggregator units across various network sites in a cost-optimal manner.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
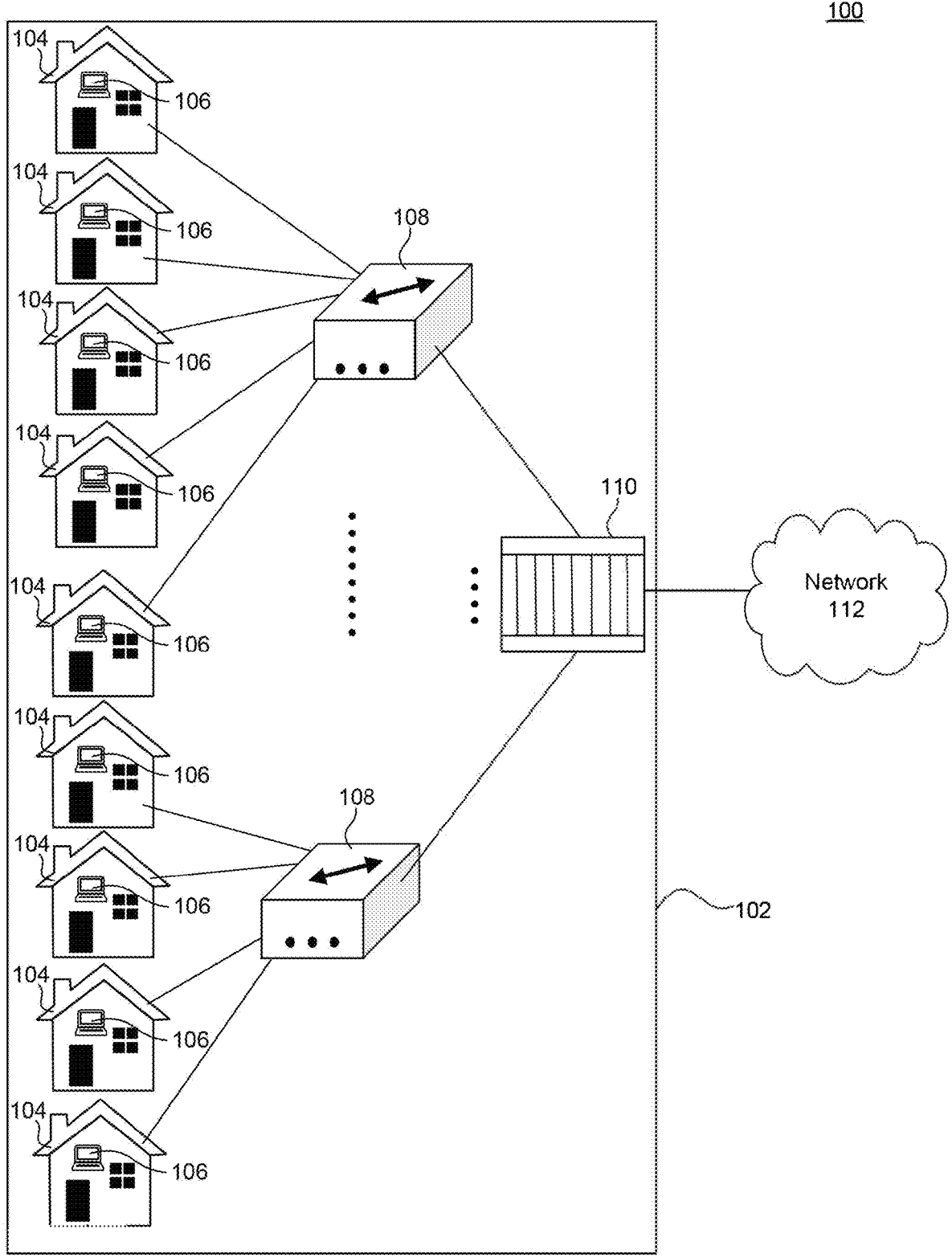
FIG. 1 illustrates an example system of a telecommunication network, according to some aspects of this disclosure.

Provided herein are system, apparatus, device, method and/or computer program product embodiments, and/or combinations and sub-combinations thereof, for optimal placement of aggregator equipment in telecommunication networks. For example, embodiments herein determine an optimal assignment of aggregator units to various network sites as well as an optimal assignment of aggregator units to various access units in the network.

According to some aspects, a telecommunication network (e.g., a fixed broadband network) may consist of multiple interconnected network sites. Subscribers within each network site may connect to the Internet via an access node (e.g., a digital subscriber line access multiplexer (DSLAM), optical line terminal (OTL), etc.). An access node may serve as a first aggregation point for network traffic generated by the subscribers. The upstream network traffic from various access nodes may be further aggregated for efficient transport to the service provider's core network. Network traffic aggregation allows a network service provider to consolidate or combine a large number of network links down to a manageable number and simplifies network complexity.

Network traffic aggregation may be performed by connecting a number of access nodes to an aggregator unit (e.g., a broadband network gateway (BNG), a broadband remote access server (B-RAS), etc.). The aggregator units themselves may be connected in a full or partial mesh topology, with multiple connections between them. Deployment of aggregator units makes up a significant fraction of the cost of delivering fixed broadband services. Hence, an important network planning and provisioning consideration is the placement of aggregator units in the network and allocation of the aggregator units among various network sites. Aggregator units may be either placed close to the service provider's core network or placed close to the subscriber, depending on the subscriber density and the access nodes' bandwidth requirements. Conventional network planning systems determine the size and the number of aggregator units that are to be deployed at a network site based primarily on information that is local to that specific network site. For example, a network planning system may only consider the current or anticipated customer density at a network site and deploy an aggregator device with the smallest capacity that may be sufficient to meet the network site's resource demands so as to minimize equipment costs. However, deploying aggregator devices without considering the broader network-wide factors such as the non-homogeneousness of network-resource demands across various network sites and the site-to-site transportation costs may result in a network configuration that is not cost-optimal.

To solve the above technological problem, embodiments described herein facilitate determining a cost-optimal traffic aggregation configuration based on network-wide information. The optimal traffic aggregation configuration specifies the type and the number of aggregator units that are to be deployed at each network site, as well as the assignment of access nodes to aggregator units that are deployed across various network sites.

Embodiments described herein monitor the network to collect network-wide information such as site-to-site traffic transport costs, the distribution and density of access nodes across various network sites, and the volume of various resource demands generated by the access nodes. According to some aspects, an optimization module may utilize information related to existing and available aggregator units and the collected network-wide information to generate an aggregator placement map that specifies the cost-optimal traffic aggregation configuration. Embodiments described herein may determine an aggregator placement map via a two-step optimization process. According to some aspects, in the first step, an optimization module utilizes the information regarding the resource demands generated by the access nodes and the resource capacities of various types of aggregator devices to generate an estimated number of each type of aggregator device needed to accommodate the cumulative resource demand in the network. According to some aspects, in the second step, the estimated numbers may be used to formulate decision variables that correspond to aggregator-to-site assignment and node-to-aggregator assignment, constraints that correspond to aggregator and node assignments, and a traffic transport and equipment cost based cost function. The optimization module inputs the cost function along with the decision variables and the constraints to an optimization solver to generate an aggregator placement map. The aggregator map generated by the optimization solver specifies a traffic aggregation configuration that incurs the minimum possible equipment and traffic transportation cost.

FIG. 1 shows an example system 100 of a telecommunication network, according to some aspects of this disclosure. System 100 may include network site 102 with one or more access nodes 108. Each access node 108 may be coupled to several customer premises 104. At each customer premise there are one or more optical network terminals and/or customer premise equipment (CPE) 106 that may connect to a service provider network 112 via an access node 108 and/or an aggregation unit 110. One or more access nodes 108 may connect to aggregation device 110. Further, the network site 102 may include one or more aggregation devices 110. Depending on traffic, some sites 102 may have no aggregation devices 110; in this case, traffic from access devices 108 should be transported to aggregated devices at another sites.

According to some aspects, access node 108 may be an Optical Line Terminal (OLT), a Digital Subscriber Line Access Multiplexer (DSLAM), and/or the like. Access node 108 may connect to a customer premise 104 using a wired communication link such as a twisted pair cable, a fiber optic cable, and/or the like. According to some aspects, an aggregator device may be a broadband network gateway (BNG), a Broadband Remote Access Server (B-RAS), and/or the like. Aggregator device 110 may connect to access node 108 using a wired link (e.g., coaxial cable, Ethernet cable, fiber optic cable, etc.), wireless link and/or combinations thereof. According to some aspects, when access node 108 is an OLT, communication between the customer premises 105 and access node 108 may be based on the Gigabit-capable Passive Optical Network (PON), Ethernet PON, or 10G PON standard. According to some aspects, when access node 108 is a DSLAM, communication between the customer premises 105 and access node 108 may be based on the asymmetric Digital Subscriber Line (DSL), Very-high-bit-rate DSL, or Symmetric DSL standard. According to aspects, communication between an access node 108 and aggregator device 110 may be based on Internet Protocol over Ethernet, Point to Point Protocol (PPP) over Ethernet, PPP over ATM, and/or Layer 2 Tunneling Protocol.

According to some aspects, each CPE 106 at a subscriber premise 104 may require a portion of the network resources in order to access broadband services via the service provider's network 112. Accordingly, subscribers may generate a demand for network resources at an upstream access node 108 to which they are connected to. The access node 108 in turn, may generate a demand for network resources at an upstream aggregator unit 110 to support its downstream subscribers. Demand for network resources generated by an access node 108 may include one or more types of resources demands. According to some aspects, the types of resource demands may include a demand to support a number of subscribers, a demand to support a number of communication links, and a demand to support an amount of network traffic.

According to some aspects, the portion of the resource demand generated by an access node 108 that corresponds to the demand to support a number of subscribers may be proportional to the number of subscriber premises 104 connected to the access node 108. According to some aspects, the portion of the resource demand generated by an access node 108 that corresponds to the demand to support a number of communication links may be proportional to the number of CPE 106 connected to the access node 108. According to some aspects, the portion of the resource demand generated by an access node 108 that corresponds to the demand to support an amount of network traffic may be proportional to the bandwidth requirements of the CPE 106 connected to the access node 108.

According to some aspects, depending on the resource demands generated by the access nodes 108, one or more access nodes 108 may be connected an aggregator unit 110 for upstream traffic aggregation. In order to provide an acceptable level of service to the downstream customers, the network resource capacity of an aggregator unit 110 should equal or exceed the cumulative resource demand generated by the one or more access nodes 108 that connect to the aggregator unit 110. According to some aspects, resource capacity available at an aggregator unit 110 may include one or more types of resource capacities. According to some aspects, types of resource capacities may include a capacity to support a number of subscribers, a capacity to support a number of communication links, and a capacity to support an amount of network traffic.

According to some aspects, an aggregator unit 110's capacity to support a number of subscribers may equal or exceed the resource demand to support a number of subscribers generated by the one or more access nodes 108 that connect to the aggregator unit 110. According to some aspects, an aggregator unit 110's capacity to support a number of communication links may equal or exceed the resource demand to support a number of communication links generated by the one or more access nodes 108 that connect to the aggregator unit 110. According to some aspects, an aggregator unit 110's capacity to support an amount of network traffic may equal or exceed the resource demand to an amount of network traffic generated by the one or more access nodes 108 that connect to the aggregator unit 110.

Figure 2:
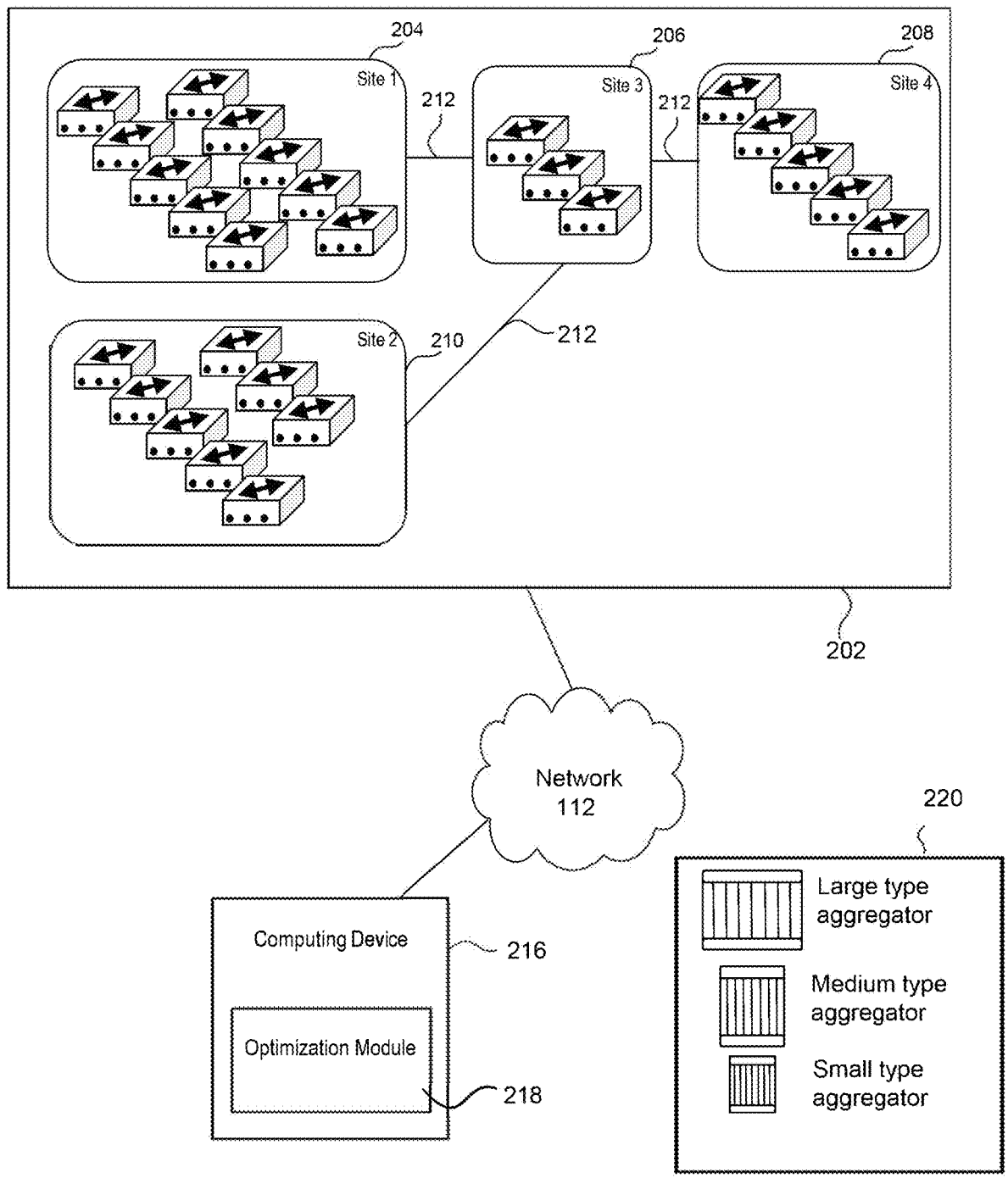
FIG. 2 illustrates an example telecommunication network with multiple network sites, according to some aspects of this disclosure.

FIG. 2 shows an example telecommunication network with multiple network sites, according to some aspects of this disclosure. By way of an example, and not as a limitation, system 200 may include network 202 with interconnected network sites 204, 206, 208, and 210. As mentioned, each network site may include multiple access nodes 108, and each access node 108 may be connected to several customer premises 104 located in the network site. According to some aspects, system 200 includes a computing device 216 connected to network 202 via the Internet or the service provider's network 112. According to some aspects, the computing device 216, the network 202, and the network 112 may each be associated with and/or managed by a single entity (e.g., network service provider, business entity, device manager, user, etc.).

According to some aspects, network sites 204, 206, 208, and 210 may be interconnected using site-to-site links 212. The site-to-site links 212 may be wired links (e.g., coaxial cable, Ethernet cable, fiber optic cable, etc.), wireless link (e.g., cellular, satellite, Wi-fi, etc.), and/or combinations thereof. According to some aspects, each site-to-site link 212 may have an associated traffic transportation cost. Each site-to-site link 212 may have a different traffic transportation cost. The traffic transportation cost of each site-to-site link 212 link may correspond to a length of the link, a transmission delay of the link, a bandwidth of the link, and/or combinations thereof.

According to some embodiments, there may be one or more types of aggregator units may be employed to aggregate traffic generated at network sites 204, 206, 208, and 210. By way of an example, and not as a limitation, an aggregator unit 110 may be classified into one or more different types 220 (e.g., a large type aggregator, a medium type aggregator, or a small type aggregator), based on its resource capacity. According to some aspects, a large type aggregator unit's resource capacity may be greater than a medium or small type aggregator unit's resource capacity, and a medium type aggregator unit's resource capacity may be greater than a small type aggregator unit's resource capacity.

According to some aspects, the computing device 216 includes an optimization module 218 that may implement an optimization procedure to determine an optimal set of aggregator units to be deployed in the network 202 and an optimal assignment of the set of aggregator units to the network sites 204, 206, 208, and 210. According to some aspects, computing device 216 may monitor network 202 to collect information related to the network sites 204, 206, 208, and 210. According to some aspects, computing device 216 may communicate with one or more routing or switching devices located in network 112 and/or network 202 and receive information related to network sites 204, 206, 208, and 210. According to some aspects, computing device 216 may query one or more routing or switching devices networks 122 and/or 202 and request information related to the network sites 204, 206, 208, and 210. According to some aspects, computing device 216 may query one or more routing or switching devices in networks 122 and/or 202 and request information related to the network sites 204, 206, 208, and 210. Computing device 216 may be configured to receive information related to the network sites 204, 206, 208, and 210 automatically on a periodic basis from the one or more routing or switching devices in networks 122 and/or 202.

According to some aspects, information obtained by computing device 216 may include the traffic transportation cost associated with each of the site-to-site links 212, the number of access nodes at each network site, and the amount of various resource demands generated by each access node. According to some aspects, the demand for network resources generated by an access node 108 may include one or more types of resources demands. According to some aspects, computing device 216 may obtain information regarding a demand to support a number of subscribers, a demand to support a number of communication links, and/or a demand to support an amount of network traffic that is generated by each access node 108 on network 202. The demand for network resources generated by the access nodes 108 at a network site may be directly proportional to the subscriber density at the network site.

According to some aspects, computing device 216 may also obtain information related to the cost and capacity of various types of aggregator devices 220 that may be available for deployment in network 202. Computing device 216 may obtain information regarding a capacity to support a number of subscribers, a capacity to support a number of communication links, and/or a capacity to support an amount of network traffic corresponding to various types of aggregator units 220. Computing device 216 may also obtain information regarding the number and type of pre-installed aggregator units that may currently be deployed in network 202. According to some aspects, some or all of the information related to the network sites and the aggregator units may be provided by a network service provider. Computing device 216 may format the available information and inputs it to optimization module 218. According to some aspects, optimization module 218 may use the input information to generate an aggregator placement map that specifies an optimal set of aggregator units to be deployed in network 202 and an optimal assignment of the set of aggregator units to network sites 204, 206, 208, and 210.

Figure 3:
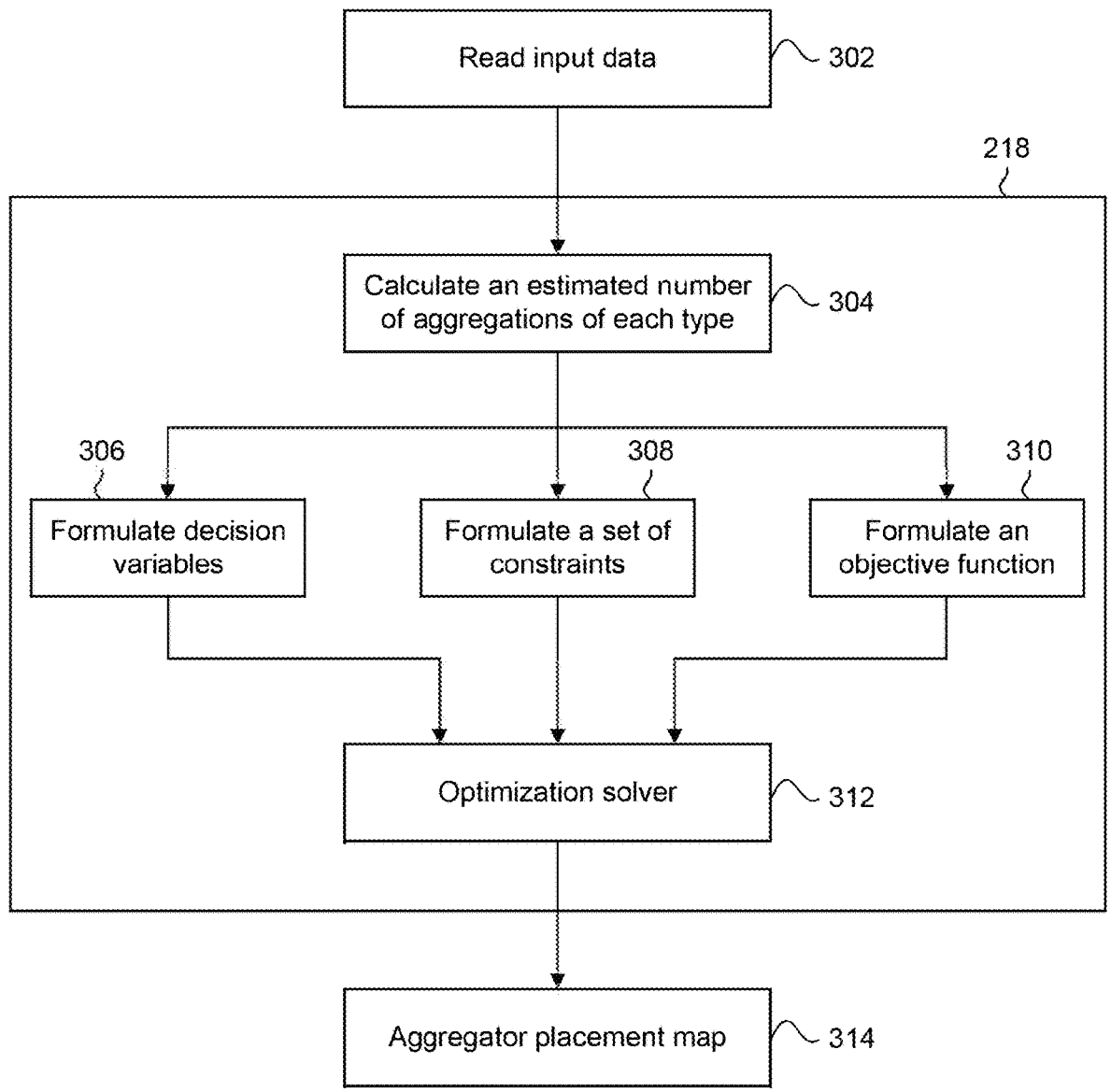
FIG. 3 is a flowchart illustrating a network optimization procedure executed by an optimization module to determine an aggregator placement map, according to some aspects of this disclosure.

FIG. 3 is an example diagram 300 describing a network optimization function/procedure executed by the optimization module 218 of FIG. 2 to determine an aggregator placement map 314 that specifies a cost-optimal traffic aggregation configuration. According to some aspects, network-wide information obtained by computing device 216 is provided as input 302 to optimization module 218. According to some aspects, optimization module 218 may generate an aggregator placement map 314 via a two-step optimization process. In the first step, at 304, optimization module 218 utilizes input data 302 to generate an estimated number of each type of aggregator device needed to accommodate the cumulative resource demand in the network. In the second step, the estimated numbers may be used to formulate decision variables that correspond to aggregator-to-site assignment and node-to-aggregator assignment, constraints that correspond to aggregator and node assignments, and a transport and equipment cost-based objective function, at 306, 308, and 310, respectively. The optimization module 218 inputs the formulated cost function along with the decision variables and constraints to an optimization solver 312 to generate an aggregator placement map 314.

At 302, computing device 216 provides input data 302 to optimization module 218. According to some aspects, input data 302 provided to optimization module 218 by computing device 216 may include parameters shown in Table 1.

TABLE 1

Input Data

Input data:
 S: Number of sites in the network
 N: Number of access nodes in the network
 $T_{S \times S}$: S × S matrix of site-to-site transport cost per link
 $A_{S \times N}$: S × N binary matrix of node to site assignment
 Resource_types = $\{r_1, r_2, \ldots, r_R\}$ is the set of R types of resources
 Aggregator_types = $\{agg\_type_1, agg\_type_2 \ldots, agg\_type_G\}$ is the set of G types of aggregator units
 Cost_agg_type($agg\_type_g$): Cost of an aggregator unit of type $agg\_type_g$,
  where g = 1, 2, . . . . G.
 Cost_port_agg($agg\_type_g$): Cost of each port of an aggregator unit of type $agg\_type_g$, where g = 1, 2, . . . . G.
 $C_{G \times R}$: G × R matrix of resource capacity of each aggregator type corresponding to each resource type
 $D_{N \times R}$: N × R matrix of resource demands generated by each node corresponding to each resource type
 Num_pre_installed_agg($agg\_type_g$): Number of pre-installed aggregators of type $agg\_type_g$, where g = 1, 2, . . . . G.
 Parameters of each pre-installed aggregator (site id, # of ports)
 Np: Total number of pre-installed aggregators
 $I_{paid\_ports(Np)}$: 1 × Np Integer array, where $I_{paid\_ports(Np)}$(a) is a number of ports of pre-installed aggregator a, and a = 1, 2, . . . . Np.

Computing device 216 may represent input data 302 in the format shown in the above Table 1 for computational efficiency. Computing device 216 may format input data as shown in Table 1 as an example and not as a limitation. For the exemplary network 202 with network sites 204, 206, 208, and 210, the site-to-site transport cost matrix, $T_{S \times S}$, is a 4×4 matrix with elements corresponding to the traffic transportation costs associated with each of the site-to-site links 212. The transport cost from site 1 (204) to site 4 (208) is given by element (1,4) of the matrix $T_{S \times S}$. For the exemplary network 202 (with 26 access nodes and 4 aggregators), computing device 216 may number each of the 26 access nodes, and the node to site assignment matrix may be represented as a 4×26 binary matrix. When an access node labeled 24, for example, is assigned to site 4 (208), the element (4, 24) of the matrix $A_{S \times N}$ should be equal a one. Further, when the access node labeled 24 is assigned to site 4 (208), each of the elements (1, 24), (2, 24), and (3, 24) of matrix $A_{S \times N}$ should be equal to a zero.

By way of an example and not as a limitation, the resource types may include a number of subscribers, a number of communication links, and an amount of network traffic (i.e., R=3 and resource_types={number of subscribers, number of communication links, amount of network traffic}). By way of an example and not as a limitation, the aggregator types may include large type aggregators, medium type aggregators, and small type aggregators (i.e., G=3 and aggregator_types={large type, medium type, small type}). Accordingly, $C_{G \times R}$, the matrix of resource capacity of each aggregator type corresponding to each resource type is a 3×3 matrix. As an example, element (2, 2) of matrix $C_{G \times R}$ may represent the number of communication links that can be supported by a medium type aggregator. Further, for the exemplary network 202, the matrix of resource demands generated by each node corresponding to each resource type, $D_{N \times R}$, is a 26×3 matrix, and as an example, element (16, 3) of matrix $D_{N \times R}$ represents a resource demand to send/receive an amount of network traffic for an access node labeled 16. The optimization module 218 may use input data 302 to generate an estimate of the maximum number of each type of aggregator device that may be needed to accommodate the cumulative resource generated by the access nodes.

At 304, optimization module utilizes input data 302 and calculates an estimated number of aggregators of each type. The estimated number serves to limit the search space corresponding to the optimization procedure performed by optimization module 218 to determine a cost-optimal traffic aggregation configuration. Table 2 illustrates an exemplary procedure performed by optimization module 218 to generate an estimate of the number of each type of aggregator units 220 needed to accommodate the cumulative resource demand in the network. According to some aspects, an aggregator unit may be classified as a large type aggregator, a medium type aggregator, or a small type aggregator based on its resource capacity. Accordingly, the estimate of the number of aggregator units may correspond to the sum of the estimates of the number of large type aggregator units, the number of medium type aggregator units, and the number of small type aggregator units that may be deployed in the network sites 204, 206, 208, and 210.

TABLE 2

Estimating the number of aggregators

Estimating the number of aggregators:
1. For each aggregator type agg_type$_i$ ∈ Aggregator_types, calculate a number of corresponding aggregators Num_Agg(agg_type$_i$) as described in 1.1-1.3:

TABLE 2-continued

Estimating the number of aggregators 1.1. For every resource type r$_j$ ∈ Resource_types, calculate a total demand Total_resource_demand(r$_j$) of type r$_j$ from all access nodes:

$$\text{Total\_resource\_demand}(r_j) = \sum_{i=0}^{N} D_{N \times R}(i, j)$$

1.2. For every aggregator type agg_type$_i$ and resource type r$_j$, calculate $$\text{Num\_agg}(\text{agg\_type}_i, r_j) = \frac{\text{Total\_resource\_demand}(r_j)}{C_{G \times R}(i, j)}$$

1.3. Calculate an estimated number of aggregators of type agg_type$_i$ (incl. pre-installed):

$$\text{Num\_Agg}(\text{agg\_type}_i) = \text{Num\_pre\_installed\_agg}(\text{agg\_type}_i) + \max_j \{\text{Num\_agg}(\text{agg\_type}_i, r_j)\}$$

2. Calculate a total estimated number of aggregators A:

$$A = \sum_{i=1}^{G} \text{Num\_Agg}(\text{agg\_type}_i)$$

Note:
Aggregators 1 through A are assumed to be ordered by type, i.e., aggregators 1 through Num_Agg(agg_type$_1$) are aggregators of type agg_type$_1$, and aggregators Num_Agg(agg_type$_{g-1}$) + 1 through Num_Agg(agg_type$_g$) are aggregators of type agg_type$_g$, where g = 1, 2, ... G.

According to some aspects, to calculate an estimate of the number of aggregators of each type, optimization module 218 may calculate the total resource demand of each type that is generated by all the access nodes. The demand for network resources generated by the access nodes may include one or more types of resources demands such as a demand to support a number of subscribers, a demand to support a number of communication links, and a demand to support an amount of network traffic. The total resource demand of each type may be calculated using input $D_{N \times R}$, which is the matrix of resource demands generated by each node corresponding to each resource type, as shown in Table 2. For example, the total demand to support a number of subscribers can be obtained by adding all the elements of the column of the matrix $D_{N \times R}$ that corresponds to the demand to support a number of subscribers.

According to some aspects, the resource capacity of each aggregator device may include one or more types of resource capacities. For example, each aggregator device may have resource capacity to support a number of subscribers, a capacity to support a number of communication links, and/or a capacity to support an amount of network traffic.

According to some aspects, an estimate of the number of large type aggregator units determined by optimization module 218 is the number of large type aggregator units that may be required to satisfy the total resource demand. For example, to estimate the number of large type aggregator units, the following may be determined: a number of large type aggregator units required to support the total number of subscribers served by all the access nodes 108 in the network 212, a number of large aggregator units required to support the total number of upstream connections required by all the access nodes 108 in the network 212, and a number of large aggregator units required to support the total traffic generated by all the access nodes 108 in network 212. The maximum of these three numbers is the estimated number of new/additional large aggregator units that may be deployed in the network 212.

As shown in Table 2, the number of large aggregator units required to support the total number of subscribers may be obtained by dividing the total resource demand corresponding to supporting subscribers by the number of subscribers a large type aggregator unit can support. Similarly, as shown in Table 2, the number of large aggregator units required to support the total number of upstream connections may be obtained by dividing the total resource demand corresponding to supporting upstream connections by the number of upstream connections a large type aggregator unit can support. Similarly, the number of large aggregator units required to support the total traffic generated may be obtained by dividing the total resource demand corresponding to supporting traffic by the amount of traffic a large type aggregator unit can support. As shown in Table 2, the estimate of the number of large type aggregator units may be obtained as the sum of the estimated number of new/additional large type aggregator units and the number of pre-installed large type aggregator units.

According to some aspects, an estimate of the number of medium type aggregator units determined by optimization module 218 is the number of medium type aggregator units that may be required to satisfy the total resource demand. For example, to estimate the number of medium type aggregator units, the following may be determined: a number of medium type aggregator units required to support the total number of subscribers served by all the access nodes 108 in the network 212, a number of medium aggregator units required to support the total number of upstream connections required by all the access nodes 108 in the network 212, and a number of medium aggregator units required to support the total traffic generated by all the access nodes 108 in the network 212. The maximum of these three numbers is the estimated number of new/additional large type aggregator units that may be deployed in the network 212.

As shown in Table 2, the number of medium aggregator units required to support the total number of subscribers may be obtained by dividing the total resource demand corresponding to supporting subscribers by the number of subscribers a medium type aggregator unit can support. Similarly, as shown in Table 2, the number of medium aggregator units required to support the total number of upstream connections may be obtained by dividing the total resource demand corresponding to supporting upstream connections by the number of upstream connections a medium type aggregator unit can support. Similarly, the number of medium aggregator units required to support the total traffic generated may be obtained by dividing the total resource demand corresponding to supporting traffic by the amount of traffic a medium type aggregator unit can support. As shown in Table 2, the estimate of the number of medium type aggregator units may be obtained as the sum of the estimated number of new/additional medium type aggregator units and the number of pre-installed medium type aggregator units.

According to some aspects, an estimate of the number of small type aggregator units determined by optimization module 218 is the number of small type aggregator units that may be required to satisfy the total resource demand. For example, to estimate the number of small type aggregator units, the following may be determined: a number of small type aggregator units required to support the total number of subscribers served by all the access nodes 108 in the network 212, a number of small aggregator units required to support the total number of upstream connections required by all the access nodes 108 in the network 212, and a number of small aggregator units required to support the total traffic generated by all the access nodes 108 in the network 212. The maximum of these three numbers is the estimated number of new/additional small type aggregator units that may be deployed in the network 212.

As shown in Table 2, the number of small aggregator units required to support the total number of subscribers may be obtained by dividing the total resource demand corresponding to supporting subscribers by the number of subscribers a small type aggregator unit can support. Similarly, as shown in Table 2, the number of small aggregator units required to support the total number of upstream connections may be obtained by dividing the total resource demand corresponding to supporting upstream connections by the number of upstream connections a small type aggregator unit can support. Similarly, the number of small aggregator units required to support the total traffic generated may be obtained by dividing the total resource demand corresponding to supporting traffic by the amount of traffic a small type aggregator unit can support. As shown in Table 2, the estimate of the number of small type aggregator units may be obtained as the sum of the estimated number of new/additional small type aggregator units and the number of pre-installed small type aggregator units.

According to some aspects, the total estimated number of aggregator units 'A' may be obtained as the sum of the estimated number of the large type, medium type, and small type aggregator units. Accordingly, the optimal traffic aggregation configuration determined by the optimization module 218 will include a maximum of 'A' aggregator units deployed across network sites 204, 206, 208, and 210. According to some aspects, the optimization module 218 may create an ordered set of the total estimated number of aggregator units based on their type and pre-installed status. According to some aspects, in the ordered set of A aggregator units, the first Num_Agg(agg_type$_1$) number of aggregators may correspond to large type aggregator units, the next Num_Agg(agg_type$_2$) number of aggregators may correspond to medium type aggregator units, and the last Num_Agg(agg_type$_3$) number of aggregators may correspond to small type aggregator units. Within each aggregator type, the set A should be ordered by pre-installed status, e.g. for each aggregator type, pre-installed aggregators should be the first followed by other aggregators of this type.

$I_{paid\text{-}ports(Np)}$ array from the Input data was based on number Np of pre-installed aggregators. Now, this array should be recalculated based on the estimated number of all aggregator units A' taking into account ordering of aggregators mentioned above:

$I_{paid\text{-}ports(A)}$: 1×A Integer array, where $I_{paid\text{-}ports(A)}(a)$ is a number of ports of the aggregator a that are already paid for (i.e., ports of pre-installed aggregators), and a=1, 2, . . . A. A non-zero value of an element in the array indicates that the corresponding aggregator of the ordered set of A aggregator units is a pre-installed aggregator unit.

At 306, based on the estimated number of aggregator units 'A', optimization module 218 formulates a set of decision variables that can be input to optimization solver 312 to calculate an optimal aggregator placement map 314. Table 3 illustrates an exemplary set of decision variables formulated by optimization module 218 with dimensions based on the estimated number of aggregator units 'A'.

TABLE 3

Decision variables

Decision variables:
1. $A_{A \times S}$ : A × S Binary matrix of assignment of aggregator units to network sites
2. $A_{N \times A}$ : N × A Binary matrix of assignment of access nodes to aggregator units
3. ISel(A): 1 × A Binary array, where Isel(A)(a) = 1 if aggregator a has at least one access node assigned to it and a = 1, 2, . . . . A.

Computing device 216 may format decision variables as shown in Table 3 for computational efficiency. Computing device 216 may format input data as shown in the above Table 3 as an example and not as a limitation. At 306, computing device 216 may formulate the set of decision variables by setting the values of the decision variables to an initial value. According to some aspects, the values of the elements of the decisional variables may be initialized to all zero values and input to optimization solver 312. By utilizing the input decision variables, the optimization solver 312 may output decision variables with optimal values that describe an optimal aggregation configuration.

The decision variables may describe the allocation of aggregator units to network sites and the allocation of access nodes to aggregator units. The binary matrix $A_{A \times S}$ is a decision variable that describes the assignment of the ordered set of A aggregator units to the various network sites in network 202. Each row of the matrix corresponds to an aggregator of the ordered set of A aggregator units and each column corresponds to one of the S network sites in network 202. If an aggregator unit is to be assigned to a network site, the element of the matrix $A_{A \times S}$ that corresponds to the aggregator unit and the network site may be set to one. However, at step 306, optimization module 218 may input an all zero matrix $A_{A \times S}$ to optimization solver 312.

In Table 3, binary matrix $A_{N \times A}$ is a decision variable that describes the assignment of various access nodes 108 to the ordered set of A aggregator units. Each row of the matrix $A_{N \times A}$ corresponds to an access node 108 in network 202 and each row corresponds to an aggregator of the ordered set of A aggregator units. If an access node is to be assigned to an aggregator unit, the element of the matrix $A_{N \times A}$ that corresponds to the access node and the aggregator unit should be set to one. However, at step 306, optimization module 218 may input an all zero matrix $A_{A \times S}$ to optimization solver 312. The binary array $I_{Sel}(A)$ is a decision variable that indicates the subset of aggregator of the ordered set of A aggregator units that are actually deployed and assigned at least one access node.

At 308, based on the estimated number of aggregator units 'A', optimization module 218 formulates a set of constraints that can be input to optimization solver 312 to calculate an optimal aggregator placement map 314. Table 4 illustrates an exemplary set of optimization constraints formulated by optimization module 218 based on the estimated number of aggregator units 'A'. According to some aspects, the constraints specify the conditions that the optimized decision variables that are output by optimizer solver 312 are required to satisfy. For example, the set of constraints specify conditions that the decision variable matrices $A_{N \times A}$ and $A_{A \times S}$ should satisfy.

As shown in Table 4, the set of optimization constraints may include a condition that each aggregator unit can be assigned to not more than one network site. Accordingly, the sum of all elements of any row of matrix $A_{A \times S}$ is required to be less than one. Each row of matrix $A_{A \times S}$ corresponds to an aggregator unit, and since an aggregator unit cannot be assigned to more than one network site, the number of ones in each row can equal either a zero or one. The set of optimization constraints may include a condition that each access node can be assigned exactly one aggregator unit. Accordingly, the sum of all elements of any row of matrix $A_{N \times A}$ is required to be equal to one. Each row of matrix $A_{N \times A}$ corresponds to an access node, and since an access node is assigned to only one aggregator unit, exactly one element of each row of matrix $A_{N \times A}$ may equal a one, and the rest of the elements are set to zero.

TABLE 4

Optimization constraints

Constraints:
1. Each aggregator unit can be assigned to not more than one site:
$\Sigma_{i=1}^{A} A_{A \times S}(a, i) \leq 1$, for any $a \in \{1, 2, \ldots . A\}$
2. Each access node should be assigned to one aggregator unit:
$\Sigma_{i=1}^{A} A_{N \times A}(n, i) = 1$, for any $n \in \{1, 2, \ldots . N\}$
3. Total resource demands from all access nodes assigned to an aggregator unit 'a' of type 'agg_type' should not exceed a resource capacity of the aggregator unit, for each aggregator a and resource type r:
$\Sigma_{n=1}^{N} [A_{N \times A}(n, a) \times D_{N \times R}(n, r)] \leq C_{G \times R}(g, r)$, where
$a \in \{1, 2, \ldots . A\}, r \in \{1, 2, \ldots . R\}$,
$g \in \{1, 2, \ldots . G\}$, and [Num_Agg(agg_type$_{g-1}$) + $1 \leq a \leq$ [Num_Agg(agg_type$_g$)]

As shown in Table 4, the set of optimization constraints may include a condition that the total resource demand of each type that is generated by all the access nodes that are connected to an aggregator unit should not exceed the resource capacity of that aggregator to accommodate the resource demand. This constraint balances the resource capacity of the deployed aggregator units and the resource demands generated by various access nodes 108 that are connected to the aggregator units. The binary matrix $A_{N \times A}$ is a decision variable that describes the assignment of various access nodes 108 to the ordered set of A aggregator units. Each column of the matrix $A_{N \times A}$ corresponds to an aggregator unit, and the elements of each column that have a value of one indicate the access nodes that are assigned to the aggregator unit. Further, the matrix $D_{N \times R}$ represents integer-valued resource demands generated by each node corresponding to each resource type. Based on the matrices $A_{N \times A}$ and $D_{N \times R}$, the resource demand of each type generated by the access nodes connected to an aggregator unit may be determined as shown in Table 4. Further, since the aggregator units are ordered, the type of an aggregator unit may be identified based on an index of the aggregator unit in the ordered set. As an example, if the index of an aggregator unit is between Num_Agg(agg_type$_1$) and Num_Agg(agg_type$_2$), the aggregator unit is a medium type aggregator. Accordingly, for each resource type, the demand generated by all the access nodes that are connected to the aggregator cannot exceed the capacity of a medium type aggregator unit.

At 310, utilizing the estimated number of aggregator units 'A', optimization module 218 formulates an objective function that can be input to optimization solver 312 to calculate an optimal aggregator placement map 314. Table 5 illustrates an exemplary optimization function formulated by optimization module 218.

TABLE 5

Objective function

Objective function:
1. Objective function to be minimized is a sum of transport and equipment cost.
   1.1. Traffic Transport cost is calculated as:

$$\sum_{s1,s2=1}^{S} \left\{ \sum_{a=1}^{A} \left\{ \sum_{n=1}^{N} [A_{SxN}(s1, n) \times A_{NxA}(n, a)] \right\} \times A_{AxS}(a, s2) \right\} \times T_{SxS}(s1, s2)$$

1.2. Equipment cost is calculated as sum of unit and port cost.
      1.2.1. Aggregator units cost is calculated as:
      $\Sigma_{a=1}^{A} I_{Sel(A)}(a) \times \text{Cost\_agg}(a)$, where
      Cost_agg(a) = Cost_agg_type(agg_type$_g$), when
      [Num_Agg(agg_type$_{g-1}$) + 1 ≤ a ≤ [Num_Agg(agg_type$_g$)]
      1.2.2. Port cost is calculated as cost of all ports minus cost of pre-installed ports:

$$\sum_{a=1}^{A} \left\{ \sum_{n=1}^{N} [A_{NxA}(n, a) \times D_{NxR}(n, \text{link\_index})] \right\} \times \text{Cost\_port}(a) \} -$$

$$\sum_{a=1}^{A} I_{paid-ports(A)}(a) \times \text{Cost\_port}(a), \text{ where}$$

Cost_port(a) = Cost_port_agg(agg_type$_g$), when
[Num_Agg(agg_type$_{g-1}$) + 1 ≤ a ≤ [Num_Agg(agg_type$_g$)]

The exemplary objective function shown in Table 5 is a cumulative network cost function that includes site-to-site traffic transport cost and network-wide equipment cost.

As shown in Table 5, the traffic transport cost component may be a function of the following matrices: node to site assignment matrix $A_{SxN}$, aggregator units to network sites assignment matrix $A_{AxS}$, access nodes to aggregator units assignment matrix $A_{NxA}$, and the site-to-site transport cost matrix $T_{SxS}$. According to some aspects, when an access node located at a network site is connected to an aggregator unit that is located in the same network site, the traffic transport cost is considered to be zero. On the other hand, when an access node located at network site is connected to an aggregator unit that is located in another network site, the traffic transport cost is considered to be the cost associated with the site-to-site link between the two network sites.

As shown in Table 5, each access node locate at a network site s1 and connected to an aggregator unit located at network site s2 incurs a traffic transport cost of $T_{SxS}$(s1, s2), according to some aspects. Accordingly, network-wide traffic transport cost function may identify the number of access nodes at each network site that may be connected to aggregator units located at other network sites and the total site-to-site transport costs associated with the links connecting those access nodes and their corresponding aggregator units.

According to some aspects, the equipment cost component of the cost function may include the cost of all the deployed aggregator units and the cost of all network ports available at the aggregator units. As shown in Table 5, the equipment cost may include the cost of all aggregation units of all types to which one or more access nodes may be assigned. According to some aspects, the cost of a large type aggregator unit may be greater than the cost of medium or small type aggregator units, and the cost of a medium type aggregator unit may be greater than the cost of a small type aggregator unit. According to some aspects, cumulative aggregation device cost may include only the cost of newly deployed aggregator units without including the cost of pre-installed aggregator devices.

According to some aspects, the equipment cost associated with an aggregator unit may depend on the port density or the number of ports available at the device. The cost of an aggregator unit with a higher port density may be greater than cost of an aggregator with a lower port density. Further, the port density of an aggregate unit may correspond to the capacity of the aggregator unit to support a number of communication links. As shown in Table 5, the number of ports at each aggregator unit a may be defined as the sum of the resource demand for a number of communication links generated by all the access node that are connected to the aggregator unit. The port cost associated with aggregator unit can be defined as the product of the total demand for a number of communication links and the cost per port. The cost per port of an aggregator unit may depend on the type of the aggregator unit. As shown in Table 5, the network-wide port cost associated with the deployed aggregator units may not include the port costs associated with pre-installed aggregator units.

A 312, an optimization solver may utilize the formulated decision variables, optimization constraints, and the objective function to solve an optimization problem. The goal of the optimization solver is to find values for each decision variable such that all constraints are met and the value of the objective function is minimal. According to some aspects, the optimization solver obtains a cost-optimal traffic aggregation configuration by solving a mixed-integer quadratic optimization problem. According to some aspects, to determine the cost-optimal traffic aggregation configuration, the optimization solver may utilize a branch-and-bound algorithm, generalized Bender decomposition, outer approximation, genetic algorithm, particle swarm algorithm, simulated annealing algorithm, and/or the like. According to some aspects, the optimization solver may be a generic commercial optimization solver (e.g., Gurobi, CPLEX, Mathematica) or an open-source generic solver (e.g., GNU Linear Programming Kit, Computational Infrastructure for Operations Research).

According to some aspects, at 312, an optimization solver may determine the optimal values of the decision variables that minimize the cumulative network cost function while satisfying the formulated set of constraints. The optimization solver may determine an optimal binary matrix $A_{AxS}$ that describes an optimal assignment of the ordered set of A aggregator units to the various network sites in network 202. The optimization solver may also determine an optimal binary matrix $A_{NxA}$ that describes an optimal assignment of various access nodes 108 to the ordered set of A aggregator units. The optimal assignment determined by the optimization solver may assign access nodes 108 to only a subset of the ordered set of A aggregator units.

At 314, computing device 218 generates an optimal aggregator placement map based one the optimal matrices $A_{AxS}$ and $A_{NxA}$ generated by the optimization solver. According to some aspects, computing device 218 may include a graphical user interface that displays the optimal aggregator placement map. According to some aspects, the optimal aggregator placement map graphically illustrates the cost-optimal traffic aggregation configuration provide by the optimal aggregator to network site assignment matrix $A_{AxS}$ and the optimal access nodes to aggregator units assignment matrix $A_{NxA}$. According to some aspects, optimal aggregator map may only include a subset of the ordered set of A aggregator units that correspond to the set of aggregator units to which one or more access nodes are assigned.

According to some aspects, information corresponding to the cost-optimal traffic aggregation configuration may be transmitted to one or more network elements in network 202. Based on the optimal traffic aggregation configuration generated by computing device 216, the connectivity configuration of the access nodes and aggregator devices at each of the network sites 204, 206, 208, and 210 may be modified.

Figure 4:
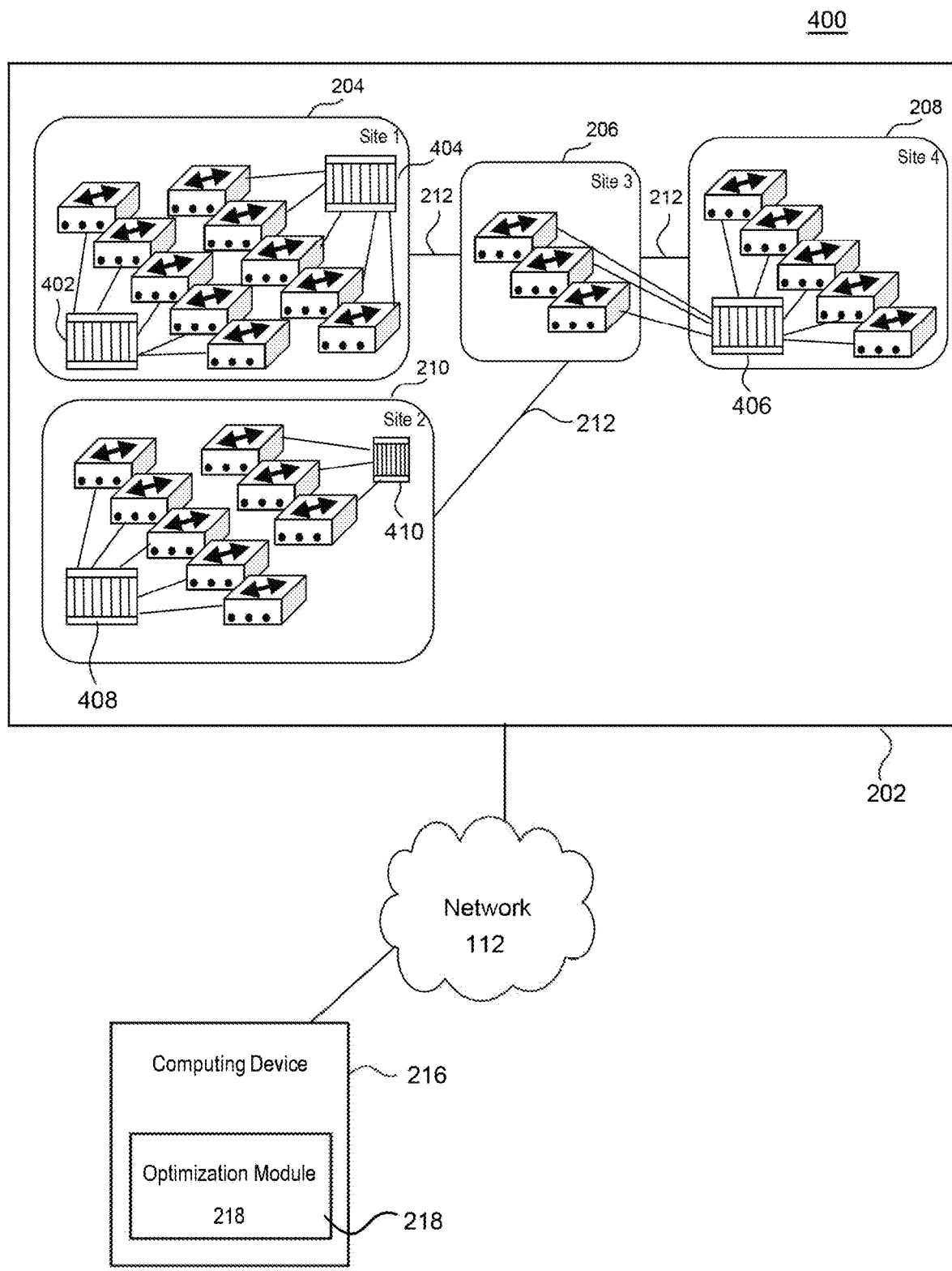
FIG. 4 illustrates an exemplary cost-optimal placement of aggregator equipment among the network sites in a telecommunication network, according to some aspects of this disclosure.

FIG. 4 illustrates an exemplary cost-optimal placement of aggregator equipment among the network sites in a telecommunication network, according to some aspects of this disclosure. An exemplary optimal traffic aggregation configuration for network 202 may comprise an optimal number and type of aggregator devices. As illustrated in FIG. 4, four large type aggregator devices, 402, 404, 406, and 408, and one small type aggregator device 410 comprise the optimal group of aggregator devices corresponding to the exemplary optimal traffic aggregation configuration.

The exemplary optimal traffic aggregation configuration of FIG. 4 includes an optimized assignment of each traffic aggregator device of the optimal group of various network sites of network 202. In this example, the optimized assignment corresponds to assigning aggregator devices 402 and 404 to network site 204, assigning aggregator device 406 to network site 208, and assigning aggregator devices 408 and 410 to network site 210.

The exemplary optimal traffic aggregation configuration of FIG. 4 also includes an optimized assignment of each aggregator unit to one or more access nodes in the network 202. In this example, as illustrated in FIG. 4, exemplary optimized assignment corresponds to connecting a subset of access nodes to ports of aggregator device 402, connecting the rest of the access nodes at network site 204 to the ports of aggregator device 404, connecting access nodes in network site 206 to ports of aggregator device 406, connecting the access nodes at network site 208 to ports of aggregator device 406, and connecting access nodes at site 210 to aggregator devices 408 and 410.

According to some aspects, information corresponding to an optimal traffic aggregation configuration determined by the computing device 216 may be transmitted the network 202 via the service provider's network 112. According to some aspects, connectivity configuration of network 202 may be modified based on an optimal traffic aggregation configuration. According to some aspects, access nodes in the network 202 may be configured to route upstream network traffic to aggregator units based on the received information corresponding to an updated optimal aggregation configuration. According to some aspects, access nodes currently connected to a pre-installed aggregation unit may be configured to disconnect from the pre-installed aggregation unit and forward network traffic to another aggregation unit based on an updated optimal traffic aggregation configuration.

Figure 5:
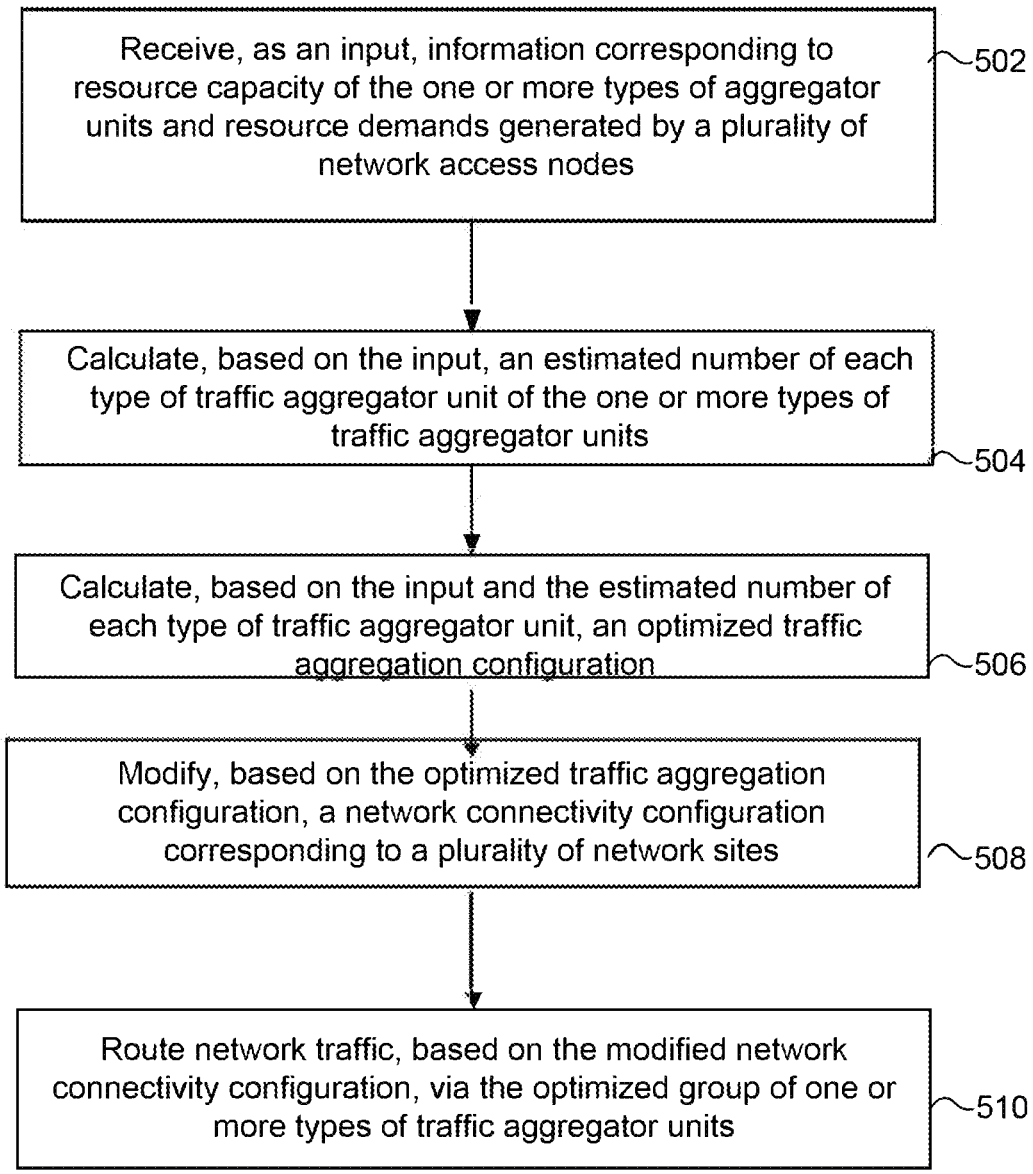
FIG. 5 is a flowchart illustrating a process for determining an optimal placement of aggregator equipment in a telecommunication network, according to some embodiments.

FIG. 5 is a flowchart for a method 500 for optimal placement of aggregator equipment in telecommunication networks, according to some aspects of this disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to those examples.

In 502, computing device 216 receives information corresponding to resource capacity of one or more aggregator units and resource demands generated by a plurality of access nodes 108 in network 202. According to some aspects, computing device 216 may communicate with one or more routing or switching devices located in networks 122 and/or 202 to receive information related to access nodes 108 and/or information related to the number and type of pre-installed aggregator units that may currently be deployed in network 202. According to some aspects, input information received by computing device 216 may be provided by a network service provider.

According to some aspects, information corresponding to the capacity of the one or more aggregator units may include information regarding a capacity to support a number of subscribers, a capacity to support a number of communication links, a capacity to support an amount of network traffic, and/or the like of the various types of aggregator units 220 (e.g., a large type aggregator, a medium type aggregator, small type aggregator). According to some aspects, the demand for network resources generated by an access node 108 may include one or more types of resources demands. According to some aspects, resource demands generated by the plurality of network access nodes 108 may correspond to a demand to support a number of subscribers, a demand to support a number of communication links, a demand to support an amount of network traffic, and/or the like.

Computing device 216 may also receive as input information regarding the distribution and location of various access nodes 108 across network sites 204, 206, 208, and 210. Information received by computing device 216 may also include the number and type of pre-installed aggregator units that may currently be deployed in network 202. Information received by computing device 216 may include the traffic transportation cost associated with each of the site-to-site links 212, cost of aggregator units of each type, the per-port cost associated with each type of aggregator unit.

In 504, based on the input received by computing device 216, optimization module 218 calculates an estimated number of each type of traffic aggregator unit of the one or more types of traffic aggregator units. The dimensions of the decision variables and optimization constraints that would be formulated by the optimization module 216 depend on the estimated number calculated in 504. Hence, the estimated number serves to limit the search space corresponding to the optimization procedure performed by optimization module 218 to determine a cost-optimal traffic aggregation configuration.

According to some aspects, optimization module 218 may calculate an estimated number of each type of aggregator unit using the procedure shown in Table 2. According to some aspects, the total estimated number of aggregator units 'A' may be obtained as the sum of the estimated number of the large type, medium type, and small type aggregator units. Accordingly, the optimal traffic aggregation configuration determined by the optimization module 218 may include a maximum of 'A' aggregator units deployed across network sites 204, 206, 208, and 210. According to some aspects, the optimization module 218 may create an ordered set of the total estimated number of aggregator units based on their type. In order to calculate an estimate of the number of aggregators of each type, optimization module 218 may first calculate the total resource demand of each type that is generated by all the access nodes 108 in network 202. The demand for network resources generated by the access nodes 108 may include one or more types of resources demands such as a demand to support a number of subscribers, a demand to support a number of communication links, and a demand to support an amount of network traffic.

According to some aspects, the estimate of the number of large type aggregator units calculated by optimization module 218 is the number of large type aggregator units that may be required to satisfy the total resource demand generated in network 202. According to some aspects, to calculate the estimated number of large type aggregator units, the optimization module may determine the following: a number of large type aggregator units required to support the total number of subscribers served by all the access nodes 108 in the network 212, a number of large aggregator units required to support the total number of upstream connections required by all the access nodes 108 in the network 212, and a number of large aggregator units required to support the total traffic generated by all the access nodes 108 in the network 212. The maximum of the three numbers is the estimated number of new/additional large aggregator units that may be deployed in network 212.

According to some aspects, optimization module 218 may determine the number of large aggregator units required to support the total number of subscribers by dividing the total resource demand corresponding to supporting subscribers by the number of subscribers a large type aggregator unit can support. Similarly, optimization module 218 may determine the number of large aggregator units required to support the total number of upstream connections by dividing the total resource demand corresponding to supporting upstream connections by the number of upstream connections a large type aggregator unit can support. Similarly, optimization module 218 may determine the number of large aggregator units required to support the total traffic generated by dividing the total resource demand corresponding to supporting traffic by the amount of traffic a large type aggregator unit can support. As shown in Table 2, optimization module 218 may obtain an estimate of the number of large type aggregator units by adding the estimated number of new/additional large type aggregator units and the number of pre-installed large type aggregator units.

According to some aspects, the estimate of the number of medium type aggregator units calculated by optimization module 218 is the number of medium type aggregator units that may be required to satisfy the total resource demand generated in network 202. According to some aspects, to calculate the estimated number of medium type aggregator units, optimization module may determine the following: a number of medium type aggregator units required to support the total number of subscribers served by all the access nodes 108 in the network 212, a number of medium aggregator units required to support the total number of upstream connections required by all the access nodes 108 in the network 212, and a number of medium aggregator units required to support the total traffic generated by all the access nodes 108 in the network 212. The maximum of the three numbers is the estimated number of new/additional medium aggregator units that may be deployed in the network 212.

According to some aspects, optimization module 218 may determine the number of medium aggregator units required to support the total number of subscribers by dividing the total resource demand corresponding to supporting subscribers by the number of subscribers a medium type aggregator unit can support. Similarly, optimization module 218 may determine the number of medium aggregator units required to support the total number of upstream connections by dividing the total resource demand corresponding to supporting upstream connections by the number of upstream connections a medium type aggregator unit can support. Similarly, optimization module 218 may determine the number of medium aggregator units required to support the total traffic generated by dividing the total resource demand corresponding to supporting traffic by the amount of traffic a medium type aggregator unit can support. As shown in Table 2, optimization module 218 may obtain an estimate of the number of medium type aggregator units by adding the estimated number of new/additional medium type aggregator units and the number of pre-installed medium type aggregator units.

According to some aspects, the estimate of the number of small type aggregator units calculated by optimization module 218 is the number of small type aggregator units that may be required to satisfy the total resource demand generated in network 202. According to some aspects, to calculate the estimated number of small type aggregator units, optimization module may determine the following: a number of small type aggregator units required to support the total number of subscribers served by all the access nodes 108 in the network 212, a number of small aggregator units required to support the total number of upstream connections required by all the access nodes 108 in the network 212, and a number of small aggregator units required to support the total traffic generated by all the access nodes 108 in the network 212. The maximum of the three numbers is the estimated number of new/additional small aggregator units that may be deployed in the network 212.

According to some aspects, optimization module 218 may determine the number of small aggregator units required to support the total number of subscribers by dividing the total resource demand corresponding to supporting subscribers by the number of subscribers a small type aggregator unit can support. Similarly, optimization module 218 may determine the number of small aggregator units required to support the total number of upstream connections by dividing the total resource demand corresponding to supporting upstream connections by the number of upstream connections a small type aggregator unit can support. Similarly, optimization module 218 may determine the number of small aggregator units required to support the total traffic generated by dividing the total resource demand corresponding to supporting traffic by the amount of traffic a small type aggregator unit can support. As shown in Table 2, optimization module 218 may obtain an estimate of the number of small type aggregator units by adding the estimated number of new/additional small type aggregator units and the number of pre-installed small type aggregator units.

In 506, optimization module 218 calculates an optimized traffic aggregation configuration based on the input and the estimated number of each type of traffic aggregator unit. According to some aspects, based on the input and the estimated number of each type of aggregator unit, the optimization module 218 formulates an initialized set of decision variables, a set of optimization constraints, and a cost-based objective function. According to some aspects, an initialized set of decision variables correspond to a set of decision variables with values set to a predefined initial value (e.g., all elements of each decision variable are set to a 0 or 1). An optimization solver utilizes the initialized decision variables, optimization constraints, and the objective function to solve an optimization problem and find optimal values for each decision variable such that the value of the objective function is minimized.

According to some aspects, the set of decision variables formulated by optimization module 218 may describe the allocation of aggregator units to network sites and the allocation of access nodes to aggregator units. One of the decision variables formatted by optimization module 218 may be a binary matrix $A_{A \times S}$ that describes the assignment of the ordered set of A aggregator units to the various network sites in network 202. Each row of the matrix corresponds to an aggregator of the ordered set of A aggregator units and each column corresponds to one of the S network sites in network 202. An initialized matrix $A_{A \times S}$ may comprise all zero elements. However, once the optimization solver has executed the optimization function, if an aggregator unit is to be assigned to a network site, the element of the optimal matrix $A_{A \times S}$ that corresponds to the aggregator unit and the network site may be set to one. Another decision variable formatted by optimization module 218 may be a binary matrix $A_{N \times A}$ that describes the assignment of various access nodes 108 to the ordered set of A aggregator units. Each row of the matrix $A_{N \times A}$ corresponds to an access node 108 in network 202 and each row corresponds to an aggregator of the ordered set of A aggregator units. An initialized matrix $A_{N \times A}$ may comprise all zero elements. However, once the optimization solver has executed the optimization function, if the access node is to be assigned to an aggregator unit, the element of the optimal matrix $A_{N \times A}$ that corresponds to the access node and the aggregator unit may be set to one.

According to some aspects, the set of optimization constraints formulated by optimization module 218 may include a condition that each aggregator unit can be assigned to not more than one network site and a condition that each access node can be assigned exactly one aggregator unit. The set of optimization constraints may include a condition that the total resource demand of each type that is generated by all the access nodes that are connected to an aggregator unit should not exceed the resource capacity of that aggregator to accommodate the resource demand. Further, the set of constraints serve to limit the search space corresponding to the optimization procedure performed by optimization module 218 to determine a cost-optimal traffic aggregation configuration.

According to some aspects, utilizing the estimated number of aggregator units, the optimization module 218 formulates an objective function that may be input to optimization solver to calculate an optimal aggregator placement map 314. According to some aspects, the objective function may be a function of a subset of the decision variables. According to some aspects, the objective function may be a cumulative network cost function that includes site-to-site traffic transport cost and network-wide equipment costs. An optimization solver utilizes the initialized decision variables, optimization constraints, and the objective function to solve an optimization problem and find optimal values for each decision variable such that the value of the cumulative network cost function is minimized.

According to some aspects, the site-to-site traffic transport cost component may be a function of the following matrices: node to site assignment matrix $A_{S \times N}$, aggregator units to network sites assignment matrix $A_{A \times S}$, access nodes to aggregator units assignment matrix $A_{N \times A}$, and the site-to-site transport cost matrix $T_{S \times S}$. According to some aspects, when an access node located at a network site is connected to an aggregator unit that is located in the same network site, the traffic transport cost is considered to be zero. On the other hand, when an access node located at network site is connected to an aggregator unit that is located in another network site, the traffic transport cost is considered to be the cost associated with the site-to-site link between the two network sites. Accordingly, determining network-wide traffic transport cost may involve determining the number of access nodes, at each network site, that may be connected to aggregator units located at other network sites and adding the site-to-site transport costs associated with the links connecting those access nodes and their corresponding aggregator units.

According to some aspects, the equipment cost component of the cost function may include the cost of all the deployed aggregator units and the cost of all network ports available at the aggregator units. The equipment cost may include the cost of all aggregation units of all types to which one or more access nodes may be assigned. According to some aspects, cumulative aggregation device cost may include only the cost of newly deployed aggregator units without including the cost of pre-installed aggregator devices. In addition, the equipment cost associated with an aggregator unit may depend on the port density or the number of ports available at the device. The cost of an aggregator unit with a higher port density may be greater than the cost of an aggregator with a lower port density. Further, the port density of an aggregate unit may correspond to the capacity of the aggregator unit to support a number of communication links.

According to some aspects, optimized traffic aggregation configuration represents a cost-optimal assignment of aggregator units to various network sites and a cost-optimal assignment of the access nodes to various aggregator units in network 202. Hence, the optimal traffic aggregation configuration may be represented by the decision variable matrices $A_{A \times S}$ and $A_{N \times A}$. An optimal binary matrix $A_{A \times S}$ that describes an optimal assignment of the ordered set of A aggregator units to the various network sites in network 202, and an optimal binary matrix $A_{N \times A}$ that describes an optimal assignment of various access nodes 108 to the ordered set of A aggregator units. According to some aspects, the optimization solver obtains a cost-optimal traffic aggregation configuration by solving a mixed-integer quadratic optimization problem. According to some aspects, to determine the cost-optimal traffic aggregation configuration, the optimization solver may utilize a branch-and-bound algorithm, generalized Bender decomposition, outer approximation, genetic algorithm, particle swarm algorithm, simulated annealing algorithm, and/or the like. According to some aspects, the optimization solver may be a generic commercial optimization solver (e.g., Gurobi, CPLEX, Mathematica) or an open-source generic solver (e.g., GNU Linear Programming Kit, Computational Infrastructure for Operations Research).

According to some aspects, optimization device 218 generates an optimal aggregator placement map based one the optimal matrices $A_{A \times S}$ and $A_{N \times A}$ generated by the optimization solver. According to some aspects, computing device 218 may include a graphical user interface that displays the optimal aggregator placement map. According to some aspects, optimal aggregator placement map graphically illustrates the cost-optimal traffic aggregation configuration provided by the optimal aggregator to network site assignment matrix $A_{A \times S}$ and the optimal access nodes to aggregator units assignment matrix $A_{N \times A}$. According to some aspects, optimal aggregator map may only include a subset of the ordered set of A aggregator units that correspond to the set of aggregator units to which one or more access nodes are assigned, as illustrated in FIG. 4.

In 508, a network connectivity configuration corresponding to a plurality of network sites is modified based on the optimized traffic aggregation configuration. According to some aspects, network connectivity configuration of a network site may correspond to the number and the capacity of the one or more aggregator units placed at the network site, the connectivity information corresponding to the one or more access node located at the network site and the one or more aggregator units located at the network site, and the connectivity information corresponding to a one or more access nodes located at another network site and the one or more aggregator units located at the network sites.

According to some aspects, computing device 216 may transmit information corresponding to the cost-optimal traffic aggregation configuration to one or more network elements in network 202. Based on the optimal traffic aggregation configuration, the network connectivity configuration corresponding to the network sites 204, 206, 208, and 210 may be modified. According to some aspects, modifying network connectivity configuration may involve adding one or more aggregator units to a network site and/or connecting one or more access nodes in network 202 to the one or more aggregator units at the network site. Modifying network connectivity configuration may also involve removing one or more aggregator units from a network site and/or disconnecting one or more access nodes from the one or more aggregator units.

According to some aspects, computing device 216 may transmit information corresponding to the cost-optimal traffic aggregation configuration to one or more network elements in network 202 using a wired link (e.g., coaxial cable, Ethernet cable, fiber optic cable, etc.), wireless link (e.g., cellular, satellite, Wi-fi, etc.), and/or combinations thereof. According to some aspects, optimized traffic configuration may be represented as one or more binary or integer matrices and/or one or more binary or integer vectors (e.g., matrices $A_{A \times S}$ and $A_{N \times A}$) before being transmitted to one or more network elements in network 202 (e.g., wired or mobile computing devices, routers, switches, gateways). According to some aspects, optimized traffic aggregation configuration may be represented as an optimal aggregation map before being transmitted to one or more network elements in network 202 (e.g., wired or mobile computing devices, routers, switches, gateways). According to some aspects, an optimal aggregation map illustrates the optimal network connectivity configuration corresponding to one or more network sites in network 202. According to some aspects, an optimal aggregation map may be a graphical representation of network connectivity configuration that is based on the optimal traffic aggregation configuration.

At 510, based on the modified network connectivity configuration, network traffic may be routed via the optimized group of one or more types of traffic aggregator units. According to some aspects, routing upstream network traffic, based on optimal traffic aggregation configuration, may involve forwarding network traffic from one or more customer premises 104 to an access node 108, forwarding network traffic from one or more access nodes to an aggregator unit 110, and/or forwarding aggregated traffic from an aggregator unit 110 to one or more network devices (e.g., and edge router) in network 112. According to some aspects, routing downstream network traffic, based on optimal traffic aggregation configuration, may involve forwarding network traffic from one or more network devices (e.g., edge routers) in network 112 to an aggregator unit 110, forwarding network traffic form an aggregator unit 110 to an access node 108, and/or forwarding network traffic from an access node 108 to a customer premise 104.

Figure 6:
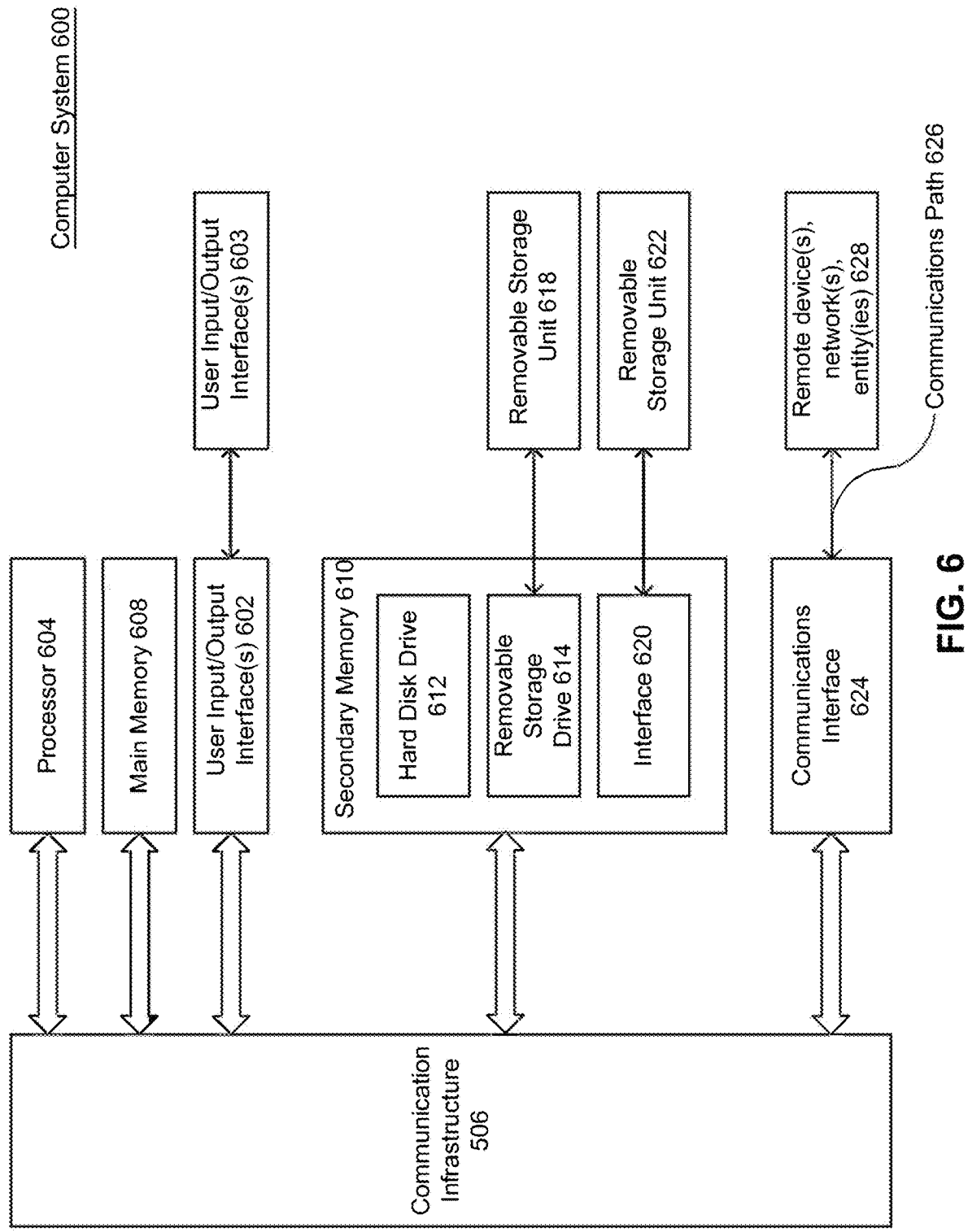
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, as an input, information corresponding to resource capacity of one or more types of traffic aggregator units and resource demands generated by a plurality of access nodes;
   calculating, based on the input, an optimized traffic aggregation configuration comprising an optimized group of the one or more types of traffic aggregator units;
   modifying, based on the optimized traffic aggregation configuration, a network connectivity configuration corresponding to a plurality of network sites; and
   routing, based on the modified network connectivity configuration, network traffic via the optimized group of the one or more types of traffic aggregator units;
   wherein the modifying or routing is performed by one or more computers.

2. The method of claim 1, wherein:
   the optimized traffic aggregation configuration is calculated based on execution of a network optimization function, and
   the execution of the network optimization function comprises:
      calculating, based on the input, an estimated number of each type of traffic aggregator unit of the one or more types of traffic aggregator units; and
      calculating, based on the input and the estimated number of each type of traffic aggregator unit, the optimized traffic aggregation configuration.

3. The method of claim 1, wherein the optimized traffic aggregation configuration further comprises:
a first optimized assignment of each traffic aggregator unit of the optimized group to a respective network site of a plurality of network sites, and
a second optimized assignment of each traffic aggregator unit of the optimized group to a respective subset of the plurality of access nodes.

4. The method of claim 3, wherein the second optimized assignment of each traffic aggregator unit of the optimized group to the respective subset of the plurality of access nodes comprises:
assigning a first traffic aggregator unit of the optimized group to a first subset of the plurality of access nodes such that resource demand generated by the first subset of the plurality of access nodes does not exceed a resource capacity of the first traffic aggregator unit.

5. The method of claim 1, wherein
the one or more types of the traffic aggregator units comprise a large aggregator unit, a medium aggregator unit, or a small aggregator unit, and
the optimized group comprises an optimal number of traffic aggregator units of each type of the one or more types of the traffic aggregator units.

6. The method of claim 1, wherein the resource demands include a number of network links to be supported, a number of subscribers to be supported, or an amount of network traffic to be supported.

7. The method of claim 1, wherein the optimized traffic aggregation configuration minimizes a network cost function that is based on site-to-site traffic transport costs and aggregator equipment costs.

8. The method of claim 1, wherein an access node of the plurality of access nodes is an optical line terminator or a digital subscriber line access multiplexer.

9. The method of claim 1, wherein a traffic aggregator unit of the optimized group is a broadband network gateway.

10. A system determining an optimal placement of aggregator units in a telecommunications network, comprising:
a memory; and
at least one processor coupled to the memory and configured to:
receive, as an input, information corresponding to resource capacity of one or more types of traffic aggregator units and resource demands generated by a plurality of access nodes; calculate, based on the input, an optimized traffic aggregation configuration comprising an optimized group of one or more types of the traffic aggregator units;
modify, based on the optimized traffic aggregation configuration, a network connectivity configuration corresponding to a plurality of network sites; and
route, based on the modified network connectivity configuration, network traffic via the optimized group of one or more types of the traffic aggregator units.

11. The system of claim 10, wherein:
the optimized traffic aggregation configuration is calculated based on execution of a network optimization function, and
to execute the network optimization function, the at least one processor is further configured to:
calculate, based on the input, an estimated number of each type of traffic aggregator unit of the one or more types of traffic aggregator units; and
calculate, based on the input and the estimated number of each type of traffic aggregator unit, the optimized traffic aggregation configuration.

12. The system of claim 10, wherein the optimized traffic aggregation configuration further comprises:
a first optimized assignment of each traffic aggregator unit of the optimized group to a respective network site of a plurality of network sites, and
a second optimized assignment of each traffic aggregator unit of the optimized group to a respective subset of the plurality of access nodes.

13. The system of claim 12, wherein the second optimized assignment of each traffic aggregator unit of the optimized group to the respective subset of the plurality of access nodes comprises:
assigning a first traffic aggregator unit of the optimized group to a first subset of the plurality of access nodes such that resource demand generated by the first subset of the plurality of access nodes does not exceed a resource capacity of the first traffic aggregator unit.

14. The system of claim 10, wherein:
the one or more types of the traffic aggregator units comprise a large aggregator unit, a medium aggregator unit, or a small aggregator unit, and
the optimized group comprises an optimal number of traffic aggregator units of each type of the one or more types of traffic aggregator units.

15. The system of claim 10, wherein the optimized traffic aggregation configuration minimizes a network cost function that is based on site-to-site traffic transport costs and aggregator equipment costs.

16. A non-transitory computer-readable medium (CRM) having instructions stored thereon that, when executed by at least one computing device, causes the at least one computing device to perform operations comprising:
receiving, as an input, information corresponding to resource capacity of one or more types of traffic aggregator units and resource demands generated by a plurality of access nodes;
calculating, based on the input, an optimized traffic aggregation configuration comprising an optimized group of one or more types of the traffic aggregator units;
modifying, based on the optimized traffic aggregation configuration, a network connectivity configuration corresponding to a plurality of network sites; and
routing, based on the modified network connectivity configuration, network traffic via the optimized group of one or more types of the traffic aggregator units.

17. The non-transitory CRM of claim 16, wherein:
the optimized traffic aggregation configuration is calculated based on execution of a network optimization function, and
the execution of the network optimization function comprises:
calculating, based on the input, an estimated number of each type of traffic aggregator unit of the one or more types of the traffic aggregator units; and
calculating, based on the input and the estimated number of each type of traffic aggregator unit, the optimized traffic aggregation configuration.

18. The non-transitory CRM of claim 16, wherein the optimized traffic aggregation configuration further comprises:
a first optimized assignment of each traffic aggregator unit of the optimized group to a respective network site of a plurality of network sites, and a second optimized assignment of each traffic aggregator unit of the optimized group to a respective subset of the plurality of access nodes.

19. The non-transitory CRM of claim 18, wherein the second optimized assignment of each traffic aggregator unit of the optimized group to the respective subset of the plurality of access nodes comprises:
assigning a first traffic aggregator unit of the optimized group to a first subset of the plurality of access nodes such that resource demand generated by the first subset of the plurality of access nodes does not exceed a resource capacity of the first traffic aggregator unit.

20. The non-transitory CRM of claim 16, wherein:
the one or more types of the traffic aggregator units comprise a large aggregator unit, a medium aggregator unit, or a small aggregator unit, and
the optimized group comprises an optimal number of traffic aggregator units of each type of the one or more types of traffic aggregator units.

* * * * *